United States Patent [19]

Araki et al.

[11] Patent Number: 4,835,558
[45] Date of Patent: May 30, 1989

[54] POSITION CONTROL DEVICE FOR USE IN A CAMERA

[75] Inventors: Kunihiko Araki, Tokyo; Mikio Kobayashi, Kawasaki; Hiroshi Terui, Tokyo; Tohru Nishida, Yokohama, all of Japan

[73] Assignee: Ricoh Company, Ltd., Tokyo, Japan

[21] Appl. No.: 123,352

[22] Filed: Nov. 20, 1987

[30] Foreign Application Priority Data

Nov. 25, 1986 [JP] Japan .............................. 61-280512
Nov. 25, 1986 [JP] Japan .............................. 61-280513
Dec. 3, 1986 [JP] Japan .............................. 61-288234

[51] Int. Cl.$^4$ ........................................... G03B 19/12
[52] U.S. Cl. .................................. 354/156; 354/271.1
[58] Field of Search .................. 354/156, 152, 271.1

[56] References Cited

U.S. PATENT DOCUMENTS

| | | | |
|---|---|---|---|
| 3,135,182 | 6/1964 | Hintze et al. | 354/173.1 |
| 3,404,614 | 10/1968 | Naumann | 354/173.1 |
| 3,613,542 | 10/1971 | Wiessner | 354/173.1 |
| 3,640,201 | 2/1972 | Kimura | 354/173.1 |
| 3,842,587 | 10/1974 | Strauss et al. | 354/30 |
| 3,849,787 | 11/1974 | Nakagawa | 354/156 |
| 4,312,581 | 1/1982 | Miyagawa et al. | 354/106 |
| 4,443,083 | 4/1984 | Nakano | 354/271.1 |
| 4,512,647 | 4/1985 | Yamazaki | 354/152 X |
| 4,720,720 | 1/1988 | Araki et al. | 354/217 X |

FOREIGN PATENT DOCUMENTS

| | | | |
|---|---|---|---|
| 0055974 | 7/1982 | European Pat. Off. | |
| 44520 | 4/1979 | Japan | 354/152 |
| 93138 | 7/1980 | Japan | 354/156 |

Primary Examiner—Donald A. Griffin
Attorney, Agent, or Firm—Oblon, Fisher, Spivak, McClelland & Maier

[57] ABSTRACT

A position control device which comprises a ratch wheel adapted to rotate in interlock with motion of an object to be positioned, a rotation detecting unit adapted to detect an amount of rotation of the ratch wheel, a combination solenoid provided with a pawl and adapted to be driven in a direction of bringing the pawl into engagement with the ratch wheel and in a direction of separating the pawl from the ratch wheel, and a combination solenoid control unit adapted to actuate the aforementioned combination solenoid in such a manner as to bring the pawl into engagement with the ratch wheel to set the object at a prescribed position when the aforementioned rotation detecting unit detects that the amount of the rotation of the ratch wheel has reached a prescribed level.

5 Claims, 10 Drawing Sheets

POSITION CONTROL DEVICE FOR USE IN A CAMERA

This invention relates to a position control device usable for controlling the position of diaphragm vanes in a camera.

The position control device used for fixing the position of diaphragm vanes in the conventional camera is so constructed as to be operated by a procedure comprising the steps of preparatorily setting diaphragm vanes at a prescribed position against the impulsive force of a spring, retaining the diaphragm vanes in the set state with an electromagnet etc., then allowing them to move gradually in the direction of the impulsive force, and bringing them to a stop with engaging pawls after the amount of this movement has reached a prescribed level.

The mechanism for this preparatory setting of the diaphragm vanes, therefore, must comprise numerous parts and has no sufficiently high reliability. The single lens reflex camera incorporates therein a preview mode adapted to permit confirmation beforehand of the depth of field in the diaphragmed condition.

In the conventional single lens reflex camera, when the preview mode is selected for the purpose of confirming the depth of field, for example, the aforementioned position control device is actuated to set the diaphragm vanes to the prescribed position. To release the preview mode, the diaphragm vanes must be returned to their original state manually. The camera, therefore, has poor operational efficiency and the preview mode also has a complicated mechanism.

An object of this invention is to provide a position control device for use in a camera, which uses a simple mechanism, operates with high reliability, and does not require the object to be set at the prescribed position against the impulsive force such as of a spring.

Another object of this invention is to provide a position control device for diaphragm vanes in a camera, which uses a simple mechanism, operates with high reliability, and permits the preview mode to be selected and released by a simple procedure.

The object described above is accomplished by a position control device which comprises a ratch wheel adapted to rotate in interlock with motion of an object to be positioned, a rotation detecting unit adapted to detect an amount of rotation of the ratch wheel, a combination solenoid provided with a pawl and adapted to be driven in a direction of bringing the pawl into engagement with the ratch wheel and in a direction of separating the pawl from the ratch wheel, and a combination solenoid control unit adapted to actuate the aforementioned combination solenoid in such a manner as to bring the pawl into engagement with the ratch wheel to set the object at a prescribed position when the aforementioned rotation detecting unit detects that the amount of the rotation of the ratch wheel has reached a prescribed level.

The other object of this invention described above is accomplished by a preview device for a camera which comprises a diaphragm lever for actuating diaphragm vanes of a lens, a motor for moving the diaphragm lever, a ratch wheel adapted to be driven in interlock with a motion of the diaphragm lever, a combination solenoid provided with a pawl and adapted to be driven in a direction of bringing the pawl into engagement with the ratch wheel and in a direction of separating the pawl from the ratch wheel, a rotation detecting unit adapted to detect an amount of rotation of the ratch wheel, a combination solenoid control unit adapted to control the combination solenoid in such a manner as to move the pawl toward engagement with the ratch wheel when the rotation detecting unit detects that the amount of the rotation of the ratch wheel has reached a prescribed level, and a motor control unit adapted to rotate the motor forward to rotate the ratch wheel up to the aforementioned prescribed amount of rotation and then bring the motor to a stop when a preview mode is selected and to rotate the motor reversely so as to return the ratch wheel to an initial position thereof when the preview mode is released.

The position control device of the present invention for use in a camera is not provided with a mechanism to set and hold at a prescribed position an object to be positioned and, therefore, uses fewer parts and has higher reliability of operation than the conventional countertype.

When the position control device of the invention has the rotation detecting unit provided with count start adjusting means, it is allowed to eliminate any error in position control due to a mechanical play.

In the camera having the preview device of the present invention, the motor is rotated forwardly in a prescribed amount and brought to a stop to set the diaphragm vanes at a prescribed position when the preview mode is selected, whereas the motor is rotated reversely to return tho diaphragm vanes to the initial state thereof when the preview mode is released. When the preview mode is not released and the release mode is selected, the motor is further rotated forwardly to effect an exposure.

By the use of the preview device of this invention, the selection and release of the preview mode can be carried out by a simple procedure.

Now, the position control device of the present invention as embodied in a camera will be described below with reference to the accompanying drawings. It should be noted, however, that the present invention is not limited to the following working example.

Figure 1:
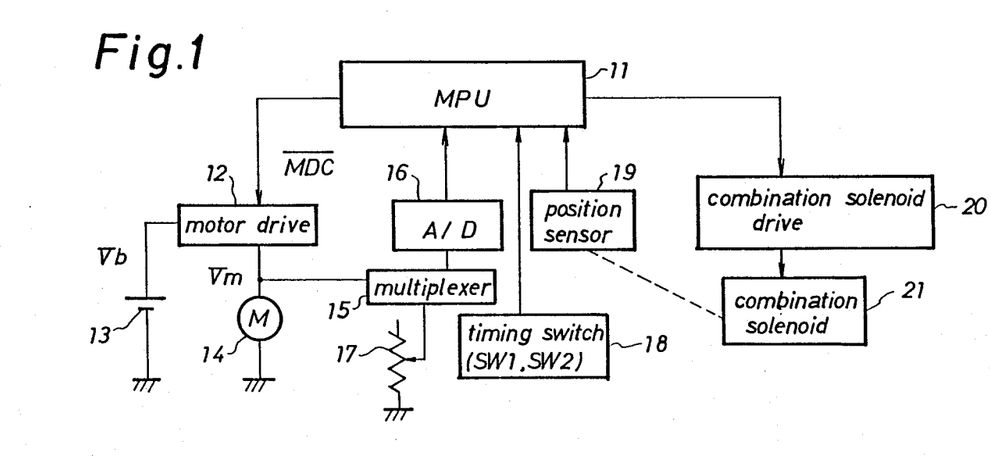
FIG. 1 is a block diagram schematically illustrating a typical position control device embodying the present invention.

FIG. 1 schematically illustrates the entire configuration of a typical device of the present invention. As illustrated in FIG. 1, a microprocessor unit (hereinafter referred to as "MPU" for short) 11 controls a motor 14 and a combination solenoid 21 through the medium of a motor drive circuit 12 and a combination solenoid drive circuit 20 in compliance with the signals received from an analog-to-digital converter 16, a timing switch 18, and a position sensor 19. The motor 14, as described more fully later on, serves the purpose of driving a diaphragm, a shutter, and a mirror of the camera. A combination solenoid is a solenoid which has a pair of magnets to move its own movable iron core in opposite directions. The structure of the combination solenoid will be explained later on. The counter voltage, $V_m$, of this motor 14 is applied to the MPU 11 via a multiplexer 15 and the aforementioned analog-to-digital converter 16. To the MPU 11 is also applied the voltage of a timing adjusting resistor 17 through the multiplexer 15 and the analog-to-digital converter 16. The timing switch 18, the position sensor 19, and the combination solenoid 21 will be described more fully later on. By the reference numeral 13 is denoted the power source for the motor 14.

Figure 5:
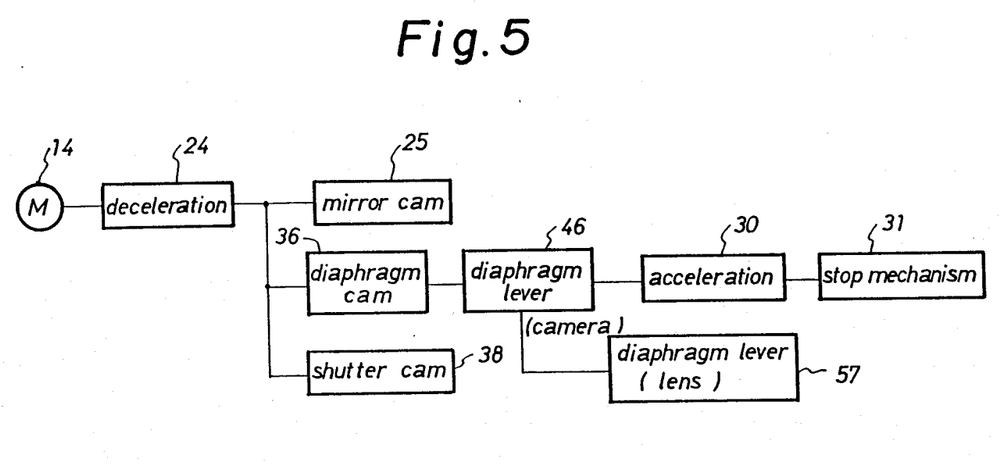
FIG. 5 is a block diagram schematically illustrating the mechanical art of the aforementioned position control device.

FIG. 5 is a block diagram illustrating a mechanical part to be driven by the motor 14. With reference to FIG. 5, the rotation of the motor 14 is decelerated by a decelerating unit 24 and then transmitted to a mirror cam 25, a diaphragm cam 36, and a shutter cam 38, causing the diaphragm cam 36 to drive a diaphragm lever 46 on the camera side. The diaphragm lever 46 is an object requiring to be set at a prescribed position by the position control device of this invention. The motion of this diaphragm lever 46 is accelerated by an accelerating mechanism 30. When this accelerating mechanism 30 arrives at a prescribed position, a stop mechanism 31 detects this arrival and stops the accelerating mechanism 30, thus effecting the position control of the diaphragm lever 46. The diaphragm lever 46 is interlocked with a diaphragm lever 57 to control the diaphragm lever 57 at a prescribed position.

Figure 8:
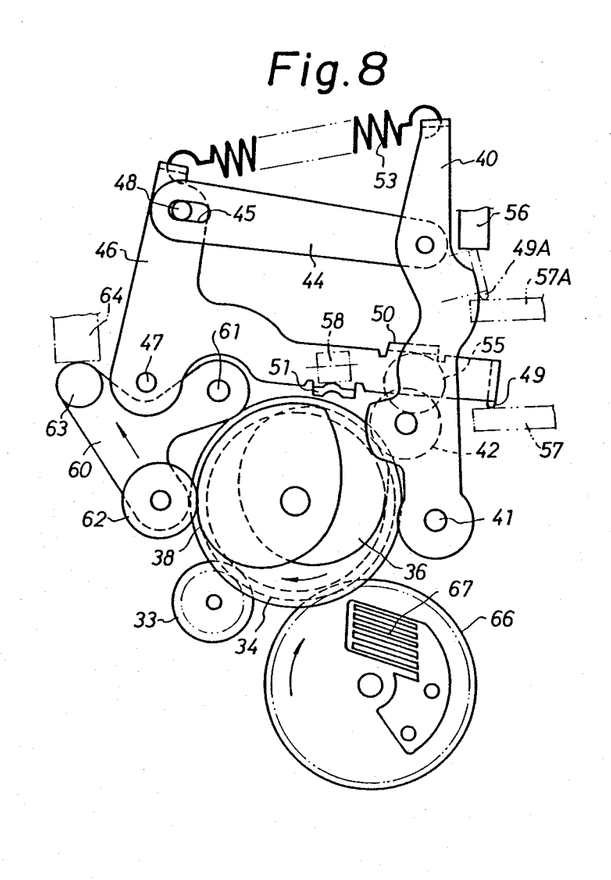
FIG. 8 is a front view of a diaphragm mechanism and a shutter setting mechanism, in the aforementioned position control device.

FIG. 8 illustrate the aforementioned diaphragm 36, shutter cam 38, and diaphragm lever 46 and peripheral mechanisms thereof. With reference to FIG. 8, a gear 33 is rotated by the motor 14 and the gear 33 rotates a cam gear 34. The cam gear 34 is integrally provided with the diaphragm cam 36 and the shutter cam 38. Beside the diaphragm cam 36, a lever 40 is disposed so as to be rotatable around a shaft 41. The lever 40 is provided with a cam follower 42. To the lever 40 is pivotally attached one end of a connecting lever 44. In an oblong hole 45 formed in the other end of the connecting lever 44, a pin 48 of the diagphram lever 46 is fitted. The diaphragm lever 46 is formed in the shape of a bell crank and is rotated about a shaft 47 in a plane parallel to the plane of rotation of the aforementioned lever 40. The lever 46 and the lever 40 are pulled toward each other with a spring 53. The leading end 49 of the diaphragm lever 46 is in contact with the diaphragm 57 on the lens side. The diaphragm 57 is urged so as to move after the diaphragm lever 46 on the camera side. The rotational diaphragm lever 46 in the clockwise direction in FIG. 8 is restricted in consequence of abutting of a bent part 50 thereof against a stopper 55, and the rotation in the counterlockwise direction is restricted in consequence of abutting of the leading end thereof against another stopper 56. In the diaphragm lever 46 is formed another bent part 51. A roller 58 is held in contact with this bent part 51.

Figure 6:
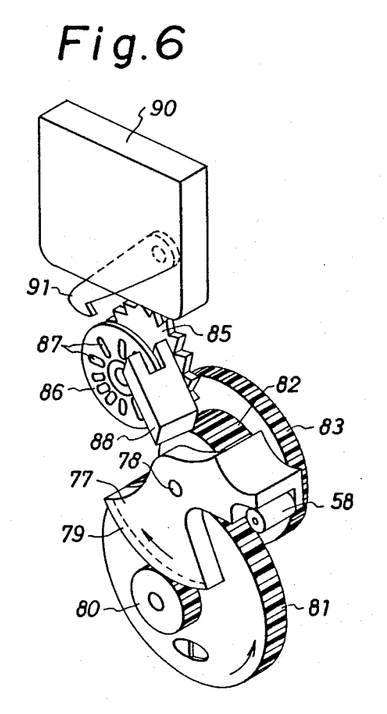
FIG. 6 is a perspective view of a speed accelerating mechanism and a stop mechanism in the aforementioned position control device.

FIG. 6 illustrates an accelerating mechanism and a stop mechanism interlocked with the diaphragm lever 46 through the roller 58. With reference to FIG. 6, the roller 58 is disposed in a lever 77 having a shaft 78 as the center of rotation thereof and having a sector gear 79 at one edge thereof. The rotational force of the sector gear 79 is transmitted through a train of acceleration gears 80, 81, 82, and 83 to a ratch wheel to rotate the same at a high-speed. To the ratch 85 is integrally attached an encoder disc 86 having a multiplicity of slits 87 spaced in the circumferential direction. A photointerrupter 88 is dosed in such a manner as to be opposed to both sides of the encoder disc 86. The photointerrupter 88 is intended to detect the light passing through the slits of the encodedr disc 86 and transmit signals in response. It corresponds to the position sensor 19 shown in FIG. 1. The amount of rotation of the ratch wheel 85 and further the amount of rotation of the diaphragm lever 46 can be detected by counting the signals transmitted from the photointerrupter 88. In other words, the encoder, disc 86 and the photointerrupter 88 jointly form a unit for the detection of the amount of rotation.

Figure 7:
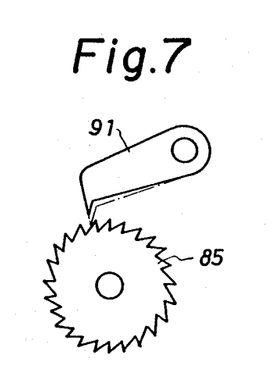
FIG. 7 is a front view of the aforementioned stop mechanism.

As illustrated in FIG. 6 and FIG. 7, a pawl 91 is opposed to the periphery of the ratch wheel 85. The pawl 91 is driven by the combination solenoid 90. When the combination solenoid 90 is excited in the normal direction or in the reverse direction, the pawl 91 is driven toward or away from the ratch wheel 85. The combination solenoid 90 is controlled by a combination solenoid control unit which comprises the MPU 11 and the drive circuit 20 (FIG. 1). When the control unit detects that the amount of rotation of the ratch wheel 85 reaches a prescribed level, by signals from the aforementioned unit for detection of the amount of rotation, it actuates the combination solenoid 90 in such a manner as to move the pawl 91 toward engagement with the ratch wheel 85 to fix the position of the diagphram lever 46 as an object to be positioned. The specific configuration of the combination solenoid 90 will be described later on.

With reference to FIG. 8, a cam follower 62 disposed on a shutter set lever 60 is held in contact with the shutter cam 38. The shutter set lever 60 is allowed to rotate about a shaft 61. When the shutter set lever 60 is rotated in the clockwise direction in FIG. 8, a pin 63 disposed at one arm part thereof pushes up a shutter charge lever 64 to set the shutter.

Figure 9:
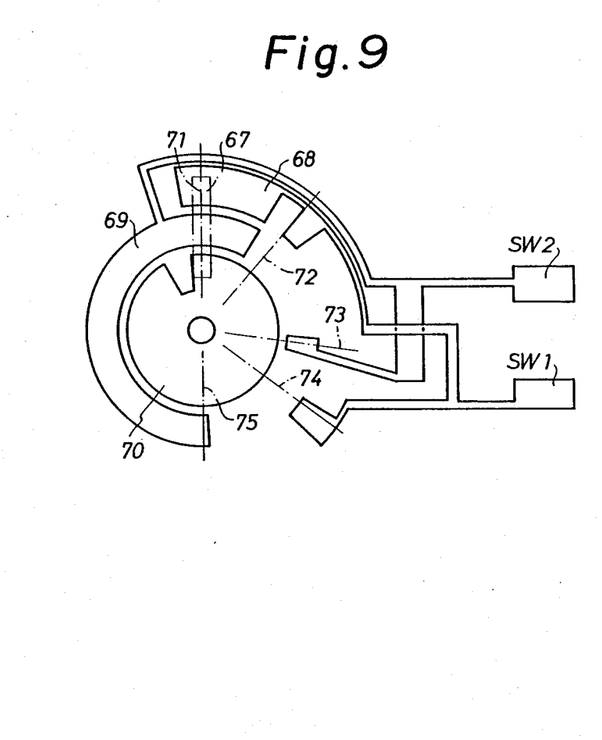
FIG. 9 is a front view of a timing switch unit in the aforementioned position control device.

With reference to FIG. 8, a gear 66 is meshed with the cam gear 34. To the gear 66 is secured the basal part of a brush 67. The brush 67 is held in sliding contct with a conductor pattern shown in FIG. 9 to form the timing switch 18 shown in FIG. 1. The conductor pattern of FIG. 9 is composed of three conductor patterns 68, 69 and 70. These conductor patterns are disposed in the order from the outside to the inside. The conductor pattern 68 constitutes a first switch SW1 and the conductor pattern 69 constitutes a second switch SW2. The conductor pattern 70 constitutes a common contact for the conductor patterns 68, 69. The brush 67 turns on or off the switches SW1 and SW2 with the position of its own rotation. The switches SW1, SW2 jointly form the timing switch 18 of FIG. 1.

In FIG. 9, the brush 67 indicated by a dotted line is held in a home position 71 and the switches SW1, SW2 are both in the ON state. As the brush 67 is rotated in the clockwise direction in FIG. 9, the switches SW1, SW2 are both turned off. When the brush 67 reaches a position 72 where counting for diaphragming is to be started, the switch SW1 is turned on As the brush 67 is further rotated, the switch SW1 is turned off. When the brfush 67 reaches a fully diaphragmed position 73, the switch SW2 is turned on. As the brush 67 is further rotated, the switch SW2 is turned off. The switch SW1 is turned on when the brush 67 reaches a mirror up position and a light re-measuring position 74. As the brush 67 is further rotated, the switch SW1 is turned on. The switch SW2 is turned on when the brush completes a rotation of about 180° from the home position 71 to reach a mirror up completion position 75. The switches SW1, SW2 are both turned off just before the brush 67 is further rotated in the clockwise direction to reach the home position 71. Then, the brush raaches the home position 71.

Figure 10:
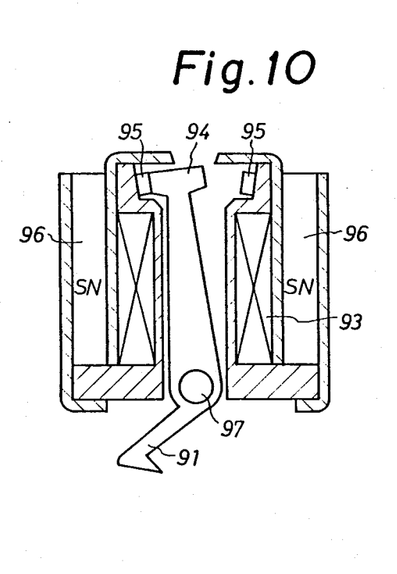
FIG. 10 is a cross section illustrating a typical combination solenoid to be used in the aforementioned position control device.
Figure 11:
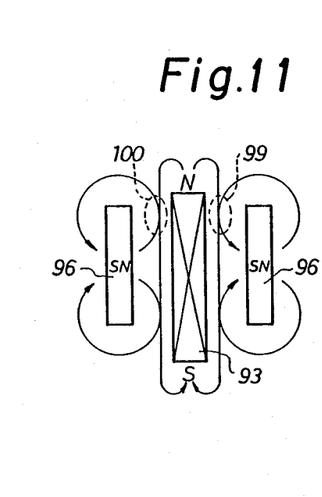
FIG. 11 is a diagram illustrating the operating principle of the aforementioned combination solenoid.

FIG. 10 and FIG. 11 illustrate a typical combination solenoid of a bistable type. Inside a coil 93, a movable iron core 94 is disposed rotatably about a shaft 97. The movable iron core 94 is formed integrally with the aforementioned pawl 91. The coil 93 is intended to form an S pole and an N pole at the upper and lower ends thereof and attract the movable iron core 94 by means of a pair of attracting plates 95, 95. A pair of magnets 96, 96 are disposed outside the coil 93. The magnets 96, 96 each has an S pole and an N pole formed in the direction of thickness.

When the S pole and the N pole formed at the upper and lower ends of the coil 93 by supply of electricity to the coil 93, a portion of large magnetic flux density 99 is generated between one of the magnets 96 and the coil 93 and a portion of small magnetic flux density 100 is generated between the other magnet 96 and the coil 93, with the result that the movable iron core 94 is caused to rotate in the direction of the portion of large magnetic flux density as illustrated in FIG. 10. When the direction of supply of electricity is reversed, the portions of large and small magnetic flux density are also reversed and the movable iron core 94 is rotated in the reverse direction. When the supply of electricity to the coil 93 is released, the movable iron core 94 retains the position existing at the moment of the release.

Figure 12:
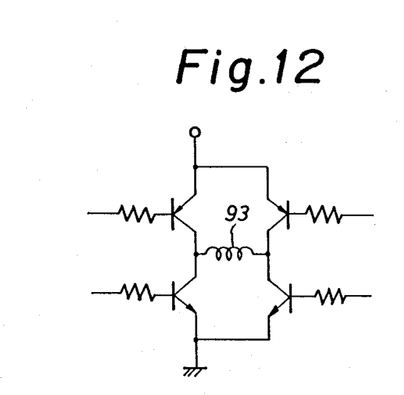
FIG. 12 is a circuit diagram illustrating a typical drive circuit for the aforementioned combination solenoid.

FIG. 12 illustrates a typical drive circuit for the bistable combination solenoid. This drive circuit supplies electric current in both directions to the coil 93 by means of such drive elements as transistors in bridge connection, for example. These transistors are controlled by the solenoid control unit such as of the MPU 11 in the configuration shown in FIG. 1.

Figure 14:
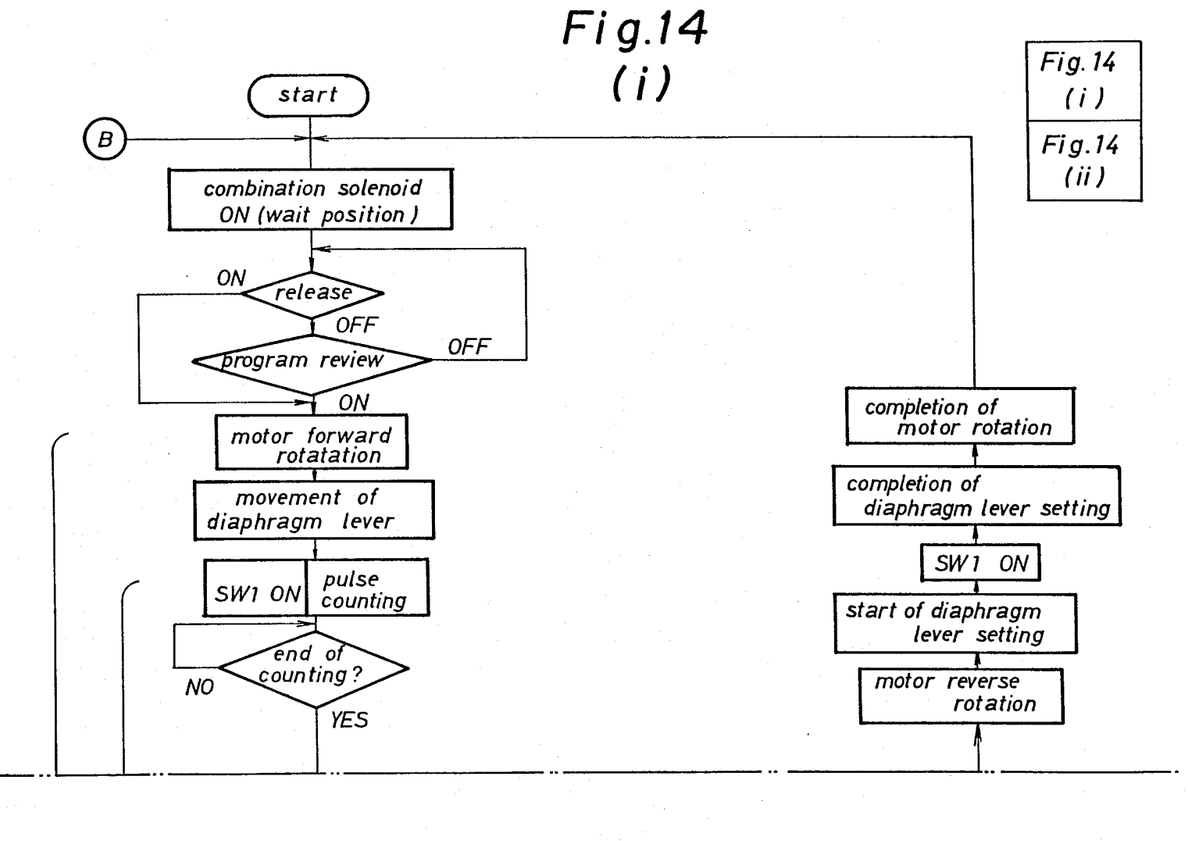
FIG. 14 is a flow chart illustrating the operation of the aforementioned position control device.
Figure 15:
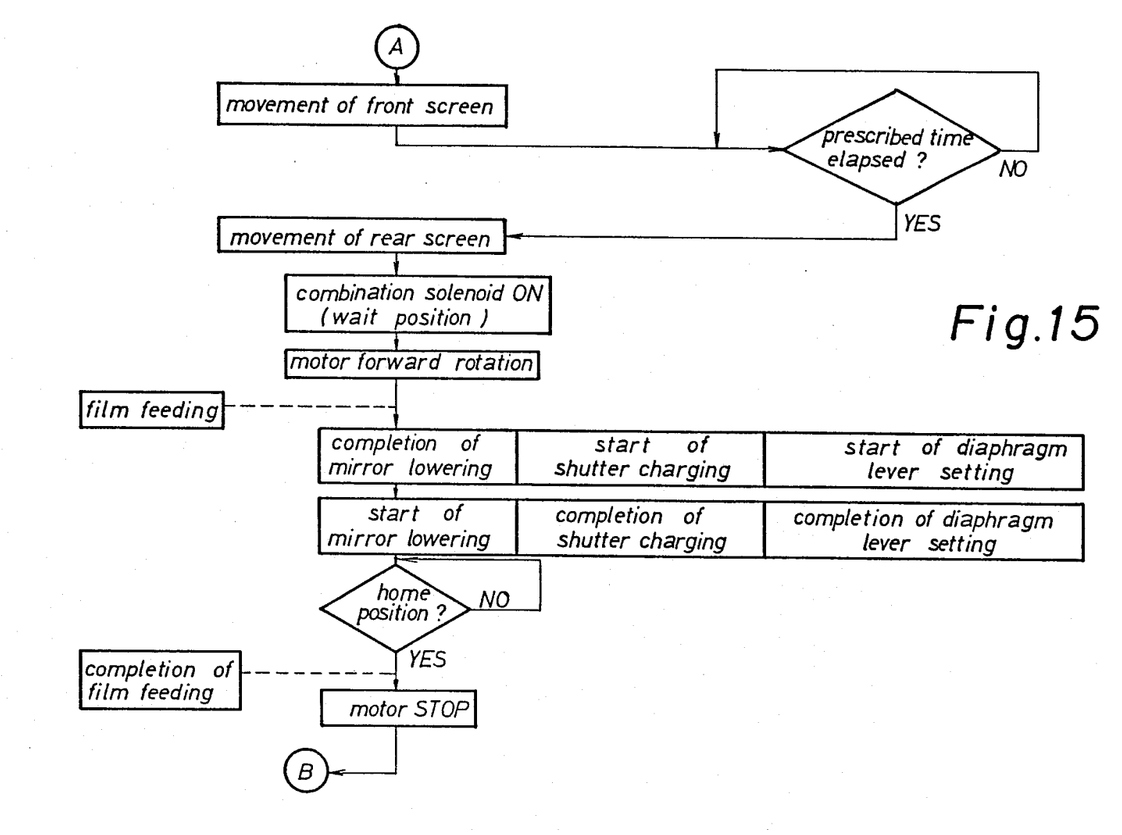
FIG. 15 is a flow chart illustrating the operation of the aforementioned position control device as a continuation of FIG. 14.

Now, the operation of the typical position control device described above will be explained below with reference to FIGS. 13 through 15.

When the combination solenoid 90 is supplied with current, the pawl 91 is set at the wait position separated from the ratch wheel 85. When the release is made in the state consequently, the motor 14 starts to rotate in the forward direction and the diaphragm cam 36 is rotated to turn the diaphragm lever 46 and the diaphragm lever 57 on the lens side starts to move (FIG. 13a). With the rotation of the motor 14, the brush 67 is driven. When the brush 67 reaches the position 72, the switch SW1 is turned on to start counting of diaphragm. The counting of diaphragm is effected by counting pulses generated by the photointerrupter 88. When the counting of the diaphragm reaches a prescribed total, current is supplied in the reverse direction to the solenoid 90 to establish engagement between the pawl 91 and the ratch wheel 85. Thus by stopping the rotation of the ratch wheel 85, the movement of the diaphragm lever 46 is brought to a stop. The prescribed total of the counting of diaphragm is computed based on the magnitude of light to be measured.

At this point, the encoder disc 86 is rotated through the medium of the train of accelerating gears. Owing to a mechanical play, for example, the photointerrupter 88 transmites a pulse delayed by a certain period, as indicatd by the symbol t in the diagram of FIG. 13, after the start of rotation of the motor 14. Thus, the timing for starting the counting of the pulse is delayed. The timing adjusting resistor 17 shown in FIG. 1 is intended to effect this adjustment of the count start timing.

Figure 13:
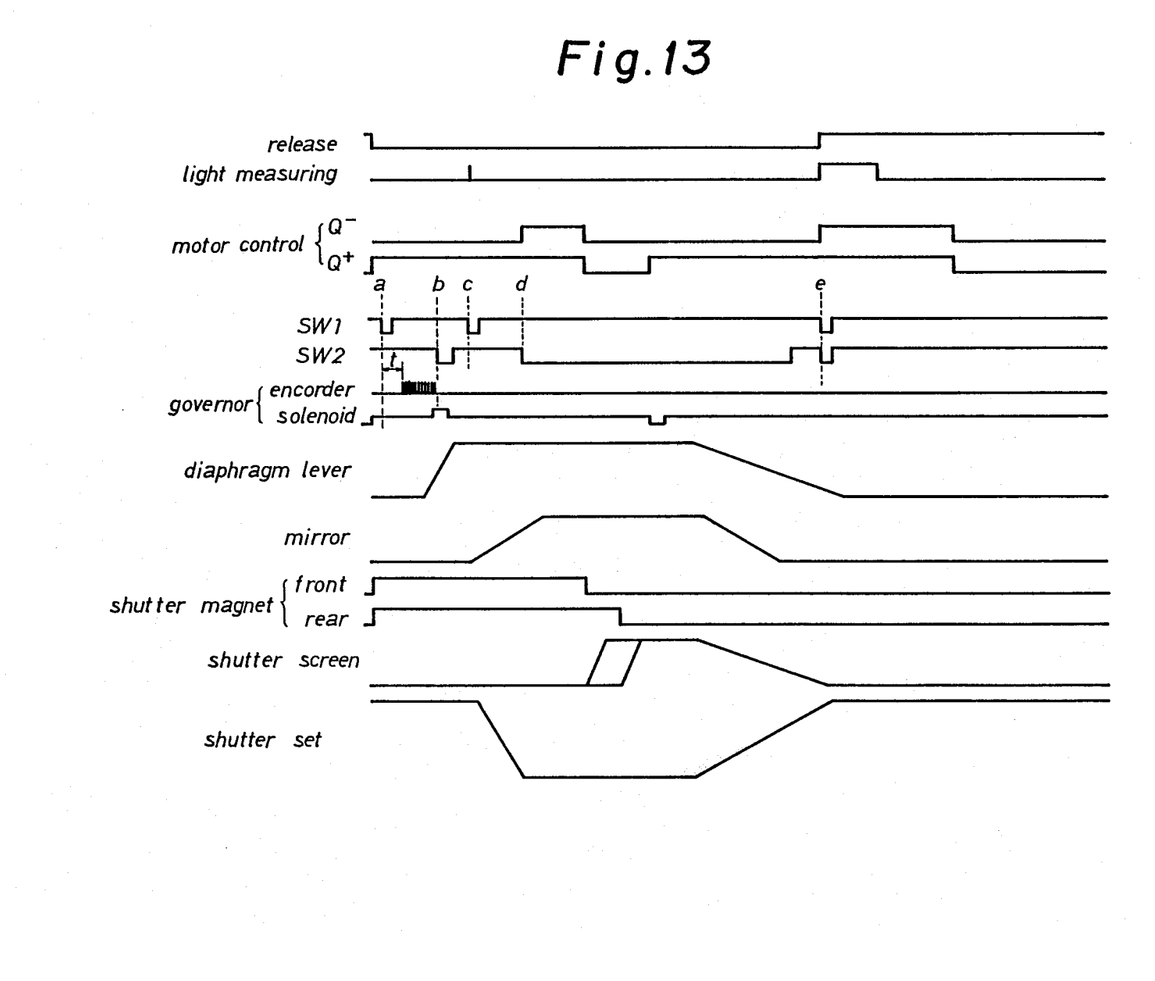
FIG. 13 is a timing chart illustrating the operating of the aforementioned position control device.

When the release mode is selected, the magnet for setting the front screen and the magnet for setting the rear screen of the shutter are both turned on when the diaphragm lever reaches the position 73 and the switch SW2 is turned on (FIG. 13b). The shutter which comprises a front screen and a rear screen is widely known in the art. It takes about 30 ms for the switch SW2 to turn on after the start of counting of diaphragm. When the motor 14 is rotated further to reach the mirror up position 74, the switch SW1 is turned on to effect measurement of light again and raise the mirror (FIG. 13c) and then the release of the mechanical charge of the shutter is started. In the mean time, the front screen and the rear screen of the shutter are retained with the respective set magnets thereof.

When the motor 14 is further rotated to reach the mirror up position 75, the switch SW2 is turned on, with the result that the motor 14 is stopped and the mirror raising motion is terminated and the release of the mechanical charge of the shutter is completed (FIG. 13d).

In consequence of the release mentioned above, the magnet for the front screen of the shutter is turned off and the front screen starts to move. At the same time, clocking of time is started. When the time thus clocked reaches the total of shutter time computed in advance on the basis of the magnitude of light measured, the magnet for the rear screen of the shutter is turned off and the rear screen starts to move. Then, current is supplied in the forward direction to the solenoid 90 to set the pawl 91 at the wait position and the motor 14 is further rotated in the forward direction. By this rotation of the motor 14, the returning of the mirror is started. By the rotation of the shutter cam 38, the shutter set lever 60 turns to start mechanical charge of the shutter. By the rotation of the diaphragm cam 36, the diaphragm lever 46 turns to start the setting of the diaphragm lever. In the meantime, feeding of the film is started.

When the motor 14 reaches the home position 71, this motor 14 is stopped and, at the same time, the feed of the film is completed to be ready for a next release (FIG. 13e).

The operation in case the program preview mode is selected after the stop of the motion of the diaphragm lever will be described below with reference to FIG. 14. In the program preview mode, the motor 14 is stopped when the switch SW2 is turned on after the stop of the motion of the diaphragm lever. In the state in which the diaphragm is set to a prescribed value, the depth of field, for example, can be observed at the prescribed value of diaphragm. When this program preview is released, current is supplied in the forward direction to the solenoid 90 to set the pawl 91 at the wait position and the motor 14 starts to rotate in the reverse direction As the result, the returning of the diaphragm is started. When the switch SW1 is turned on reaching the position 72, the returning of the diaphragm lever is completed and the rotation of the motor 14 is stopped and returned to the home position 71.

From the time the rotation of the motor in the forward direction is started till the time the raising of the mirror is completed and the release of mechanical charge of the shutter is completed, the motor is desired to be rotated at a constant speed to ensure higher operational accuracy of the device in view of the stroke of the diaphragm lever and the release timing of the shutter, for example. By this reason, the typical device described above incorporates therein a constant speed control unit for the motor as described below.

With reference to FIG. 1, the motor drive circuit 12 is intended to be turned on or off by the command from the MPU 11, making or breaking a power source to the motor 14. When the motor 14 is on, the terminal voltage, $V_m$, of the motor 14 is equal to the power source voltage, $V_b$. When the motor 14 is off, the equation $V_m = V_e = KN$ is satisfied, wherein $V_e$ stands for the counter voltage of the motor 14, K for the coefficient of proportion, and N for the number of rotations. The MPU 11 samples the terminal voltage, $V_m$ ($= V_e$), through the medium of the analog-to-digital converter 16 and controls the duty of the command signals to the motor drive circuit 12 so as to keep the reverse voltage, $V_e$ constant.

Figure 3:
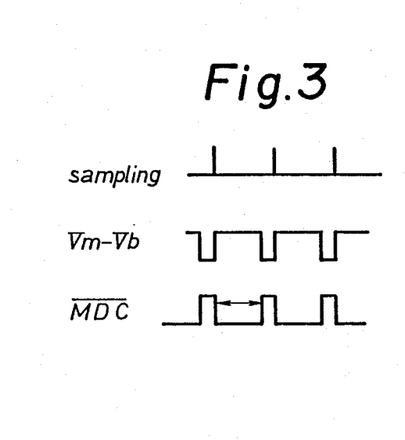
FIG. 3 is a timing chart illustrating a typical operation of the constant speed control unit.
Figure 4:
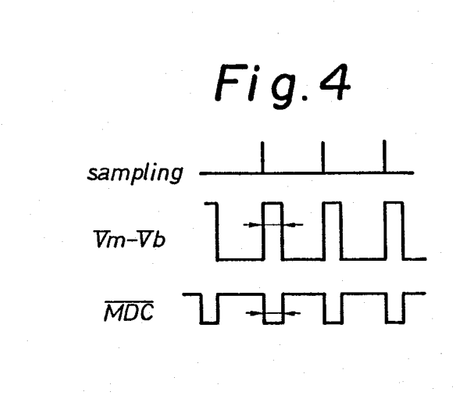
FIG. 4 is a timing chart illustrating another typical operation of the constant speed control unit.

FIG. 3 and FIG. 4 illustrate the operation of the aforementioned constant speed control unit; FIG. 3 representing the case of a low power source voltage, $V_b$ and FIG. 4 the case of a high power source voltage, $V_b$. As noted from these diagrams, the duty of the command signals from the MPU 11 is high when the power source voltage is low and the duty is low when the power source voltage is high, making it possible to control the rotational speed of the motor at a constant value.

Figure 2:
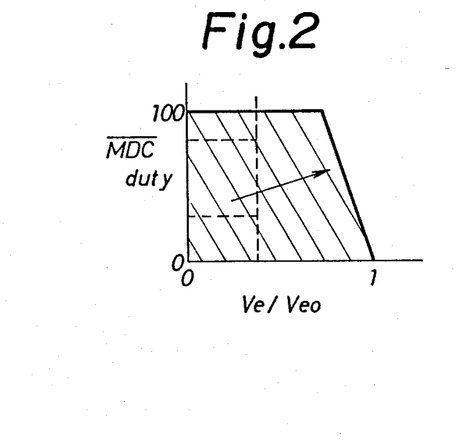
FIG. 2 is a diagram of a typical duty table of a constant speed control unit in the aforementioned device.

For the purpose of effecting the control with high accuracy, the rise of the rotation of the motor 14 is desired to be constant. The rise of the rotation of the motor, however, depends on the power source voltage. As a measure to cope with this variation, a duty table is prepared in advance as shown in FIG. 2 plotting the relation between the ratio of the reverse voltage, $V_e$, of the motor to the target value, $V_{eo}$, and the duty of the command signals transmitted from the MPU 11 for driving the motor along the course of time following the start of the motor. This duty table is stored in the MPU 11 and, in accordance with this duty table, the time for turning on the motor 14 is determined. In FIG. 2, the arrow indicates the course of time following the start of the motor. Owing to this arrangement, the duty for turning on the motor is controlled to a low level when the ratio of $V_e/V_{eo}$ is relatively large at a given time. As the result, the rise of the rotation of the motor is controlled so as to follow a fixed rising curve.

Figure 16:
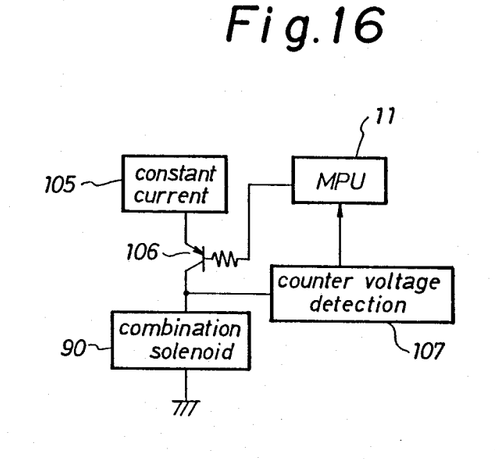
FIG. 16 is a circuit diagram illustrating another typical unit for detection of the amount of rotation of a ratch wheel.
Figure 17:
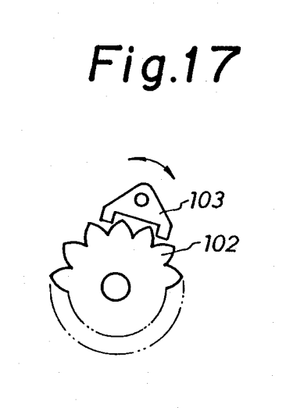
FIG. 17 is a front view illustrating a mechanical part of the aforementioned unit for the detection of the amount of rotation.

For the detection of the amount of rotation of the ratch wheel 85 necessary for the positioning of the diaphragm level 46 as an object, a circuit designed as illustrated in FIG. 16 and an anchor mechanism configurated as illustrated in FIG. 17 may be adopted. In FIG. 17, an escape wheel 102 serves as a substitute for the ratch wheel 85 shown in FIG. 6. The opposite arm ends of an anchor 103 alternately come into contact with this escape wheel 102 so that the escape wheel will be rotated intermittently at certain time intervals. This anchor 103 is meant as a substitute for the pawl 91 which is provided for the combination solenoid 90. Each time the anchor 103 makes a reciprocating rotation while no current is supplied to the solenoid 90, a reverse voltage is generated in the solenoid 90. In this arrangement, the amount of rotation of the escape wheel 102 and consequently the position of the diaphragm lever 46 can be computed by detecting the reverse voltage of the solenoid with a reverse pulse detecting circuit 107 and allowing the MPU 11 to count the detected pulse signals received from the circuit 107. The rotation of the escape wheel 102 is stopped by feeding current to the solenoid 90 when the total of count indicates that the diaphragm lever 46 has reached the prescribed position. In the working example of FIG. 2, the solenoid 90 is driven by a constant power source 105 through the medium of a transistor 106.

What is claimed is:

1. A preview device for a camera which comprises a diaphragm lever for actuating diaphragm vanes of a lens, a motor for moving the diaphragm lever, a ratch wheel adapted to be driven in interlock with a motion of the diaphragm lever, a combination solenoid provided with a pawl and adapted to be driven in a direction of bringing the pawl into engagement with the ratch wheel and in a direction of separating the pawl from the ratch wheel, a rotation detecting unit adapted to detect an amount of rotation of the ratch wheel, a combination solenoid control unit adapted to control the combination solenoid in such a manner as to move the pawl toward engagement with the ratch wheel, when the rotation detecting unit detects that the amount of the rotation of the ratch wheel has reached a prescribed level, and a motor control unit adapted to rotate the motor forward to rotate the ratch wheel up to the aforementioned prescribed level and then bring the motor to a stop when a preview mode is selected and to rotate the motor reversely so as to return the ratch wheel to an initial position thereof when the preview mode is released.

2. The preview device according to claim 1, wherein said combination solenoid control unit is adapted to control said combination solenoid in the direction of bringing said pawl into engagement with said ratch wheel when the amount of rotation of the ratch wheel has reached a prescribed level or in the direction of separating said pawl from said ratch wheel when said motor is rotated reversely.

3. A position control device comprising:

driving means connected with an object to be positioned in order to move said object, a ratch wheel connected with said object via speed increasing gears and adapted to rotate around an axis in interlock with said object when said object is moved by said driving means, a solenoid having a pawl, said solenoid being adapted to move said pawl in a direction of bringing said pawl into engagement with said ratch wheel upon reception of first voltage and move said pawl in a direction of separating said pawl from said ratch wheel upon reception of second voltage different from said first voltage in polarity, movement detecting means for detecting a start of movement of said object and producing a first signal upon detection of said start of movement, pulse generating means for generating pulses the number of which is proportional to the amount of rotation of said ratch wheel, timing adjusting means adapted to produce a second signal in a preset period of time after reception of said first signal transmitted from said movement detecting means, pulse counting means adapted to start to count the number of pulses transmitted from said pulse generating means upon reception of said second signal transmitted from said time adjusting means, and solenoid control means adapted to apply said first voltage to said solenoid when the number of pulses counted by said pulse counting means reaches a predetermined number in order to engage said pawl with said ratch wheel so that said object is located in a position corresponding to said predetermined number.

4. A position control device according to claim 3, in which said solenoid control means is adapted to apply said second voltage to said solenoid prior to rotation of said ratch wheel in order to separate said pawl from said ratch wheel.

5. A position control device according to claims 3 or 4, in which said timing adjusting means comprises a variable resistor, and a length of said preset period of time can be adjusted by adjusting a resistance of said variable resistor.

* * * * *